(12) United States Patent
Goudjil

(10) Patent No.: US 6,437,346 B1
(45) Date of Patent: Aug. 20, 2002

(54) SOLAR BLIND-UVC PHOTOCHROMIC DETECTOR AND METHOD FOR CALIBRATION

(76) Inventor: Kamal Goudjil, 3100 Pearl St., Suite B (Solartech), Boulder, CO (US) 80301

( * ) Notice: Subject to any disclaimer, the term of this patent is extended or adjusted under 35 U.S.C. 154(b) by 67 days.

(21) Appl. No.: 09/658,979

(22) Filed: Sep. 11, 2000

(51) Int. Cl.[7] .................................................. G01J 5/48
(52) U.S. Cl. ........................... 250/474.1; 250/472.1; 250/473.1; 250/482.1; 250/372
(58) Field of Search ........................... 250/474.1, 482.1, 250/372, 472.1, 473.1

(56) References Cited

U.S. PATENT DOCUMENTS

| | | | |
|---|---|---|---|
| 4,731,881 A | 3/1988 | Geller | 455/619 |
| 5,021,668 A | 6/1991 | Talmore et al. | 250/372 |
| 5,262,845 A | * 11/1993 | Milosevic et al. | 356/445 |
| 5,387,798 A | * 2/1995 | Funakoshi et al. | 250/474.1 |
| 5,581,090 A | 12/1996 | Goudjil | 250/474 |
| 5,591,978 A | * 1/1997 | Kovalsky et al. | 250/372 |
| 5,696,381 A | * 12/1997 | Quintern | 250/472.1 |
| 5,914,197 A | 6/1999 | Goudjil | 428/537 |

OTHER PUBLICATIONS

Durr et al., "Photochromism, Molecules and Systems," 1990, Elsevier, p. 493–497.*
Nitres, Inc—Website Brochure on Solar Blind UV Detectors, Aug. 2000.
Solar Blind Detector, Microsystems Technology Office, DARPA—Department of Defense, Aug. 2000.

* cited by examiner

Primary Examiner—Seungsook Ham
Assistant Examiner—Timothy Moran

(57) ABSTRACT

The present invention relates to an ultraviolet radiation detector in general and more specifically to a solar blind ultraviolet radiation detector; that is, a detector insensitive to the radiation of sunlight reaching the earth's surface but sensitive to UVC wavelengths in the spectrum, defined as the interval 200 nm–280 nm. The solar blind detector is base on the use of photochromic compounds in conjunction with ultraviolet wavelength-selective chemical blocks and their incorporation into optically clear polymer matrices. The photochromic compound is selected from the group comprising spiropyran molecules spirooxazine molecules and chromene derivatives. Applications for such device are as numerous as the sources of UVC radiation. An obvious use for such Solar Blind UVC detector is monitoring the output of UVC sources used in the decontamination of water and air (water treatment and air purification) and for sterilization of medical instruments.

19 Claims, 9 Drawing Sheets

US 6,437,346 B1

SOLAR BLIND-UVC PHOTOCHROMIC DETECTOR AND METHOD FOR CALIBRATION

STATEMENT AS TO RIGHTS TO INVENTIONS MADE UNDER FEDERALLY SPONSORED RESEARCH AND DEVELOPMENT

The present invention was conceived during the course of work supported by grant No. 2R44CA75887-02 from the National Cancer Institute.

BACKGROUND OF THE INVENTION

1. Field of the Invention

The present invention relates to ultraviolet radiation detectors in general and more specifically to a solar blind ultraviolet radiation detector; that is, a detector insensitive to the radiation of sunlight reaching the earth's surface but sensitive to UVC wavelengths in the spectrum, defined as the interval 200 nm–280 nm.

2. Description of the Prior Art

The sun emits in a broad spectrum of wavelengths including wavelengths in the ultraviolet as well as visible and infrared. However, the region of interest in this application is the ultraviolet band. Ultraviolet radiation emitted from the sun and reaching earth surface, as well as other non-natural UV sources, are a precursor of chemical reactions by breaking bonds between the constituent atoms of molecules. The radiative effects of ultraviolet radiation play an important role in biological molecules. Ultraviolet photons have the ability to excite the electronic states of molecules and probably induce photochemical reactions in molecules such as DNA, RNA or proteins in general. The ultraviolet light is divided into three regions, the UVA [320 nm–400 nm], the UVB [280 nm–320 nm], and the UVC [200 nm–280 nm]. However, the sunlight that reaches us on the ground does not contain any of the UVC portion of the light because these wavelengths are absorbed by the ozone layer in the stratosphere. UVC can only be created artificially, for example, by discharge in gases or by highly energetic flames. The UVC bandwidth [200 nm–280 nm] of the ultraviolet portion of the spectrum consists of highly energetic radiation that is capable of destroying bacteria, viruses and other microorganisms.

Many sources emitting in UVC are available. One example is a mercury lamp that has an intense emission line at a wavelength of 253.7 nm. Other UVC sources include excimer lasers (emitting at wavelengths such as 248 nm), xenon lamps, deuterium lamps, intense flames, arc welding, and energetic combustion such as in the plume of a missile or a rocket.

Applications of a solar blind detector or a UVC detector are as numerous as the sources of UVC. The solar blind terminology is derived from the fact that the ozone layer in the stratosphere completely absorbs the solar radiation of wavelengths shorter than 280 nm and the only naturally available wavelength ranges of ultraviolet radiation are the UVA and UVB. Therefore a detector limited to sensing only the UVC part of the spectrum is called a solar blind detector.

An advantage of using a solar blind detector versus using a broad band ultraviolet detector under sunlight is that the solar blind detector is not affected by the amount of natural light available and remains unperturbed. Weak signals in the solar blind region can, therefore, be detected with high signal to background ratio. The presence of natural light does not affect the solar blind sensor.

Solar blind detectors based on semiconductors or photomultipliers are currently available in the market. Existing photomultiplier technology is bulky, fragile and relatively expensive, thus limiting their range of applications. General constructional and operational features of UV solar blind detectors of this type have been described in the relevant literature (see, for example, U.S. Pat. No. 4,731,881 and, U.S. Pat. No. 5,021,668). Semiconductor technology based on nitride optoelectronic materials offers a better alternative. However, they are still relatively expensive and they rely on an electrical power supply with an electronic circuit for signal amplification. For example, Nitres, Inc., of West Lake Village, Calif. is developing AlGaN photodiode technology for solar blind applications. Furthermore governmental agencies such as the Defense Advanced Research Projects Agency (DARPA) of the Department Of Defense (DOD) is presently developing solar blind detectors under the research program on nitride optoelectronic materials and devices.

SUMMARY OF THE INVENTION

The present invention pertains to a solar blind ultraviolet radiation detector; that is, a detector insensitive to the radiation of sunlight reaching the earth's surface but sensitive to UVC wavelengths in the spectrum, defined as the interval 200 nm–280 nm.

In contrast with the prior art, the present invention is based on chemical sensors that do not require any electrical power supply or electronic amplification system. The sensing of ultraviolet is accomplished with the use of photochromic chemicals that react reversibly to ultraviolet by changing from a clear state to a colored state. The general behavior and applications of such chemicals as solar UV detectors have been described in my previous inventions: U.S. Pat. Nos. 5,581,090 and 5,914,197. Therefore, the application of photochromic compositions intended for the detection of the ultraviolet present in sunlight will not be described here.

As previously mentioned, UVC may be used to kill bacteria in environments such as water or air, for instance. Therefore, an obvious use for such solar blind UV detector is to monitor the output of any UVC source used for decontamination of water and air (water treatment and air purification) or for sterilization of biological materials (e.g., medical instruments).

An aspect of the present invention is to provide a method for making a Solar Blind-UVC detector including providing a photochromic compound having at least one of a spirooxazine and a spiropyran molecule and a chromene derivative, providing an optically clear ink selected for its propriety of minimal absorption in the UVC region, mixing the photochromic compound with the optically clear ink to produce a photochromic-ink composition, applying the photochromic ink in a form of a layer, on a substrate material, drying the layer with heat. The method further includes selecting UVA and UVB absorbing chemicals, mixing the said UVA and UVB absorbing chemicals with the optically clear ink to create a UVA and UVB blocking composition, applying the said blocking composition in a thin layer on top of the previously applied photochromic ink layer, and drying the UVA and UVB blocking layer to form a final UV sensing area where only UVC is detected.

In one embodiment the method includes producing a photochromic ink composition comprising dissolving a photochromic compound into an organic solvent and mixing the obtained solution with an optically clear ink matrix.

In another embodiment, the method includes producing a photochromic ink composition by adding ultraviolet light stabilizers and anti-oxidants to the said optically clear ink matrix.

Another aspect of the present invention is to provide a solar blind-UVC detector including:

(a) a photochromic chemical selected from the group of spiropyrans, spirooxazines and chromene derivatives, wherein said photochromic chemical is dissolved in an organic solvent and mixed to an optically clear ink, to form a photochromic composition which is applied to a substrate selected from plastic, paper, glass and metal. The optically clear ink is selected from a group of inks having the propriety of not absorbing in the UVC region of the spectrum;

(b) ultraviolet light selective chemical absorbers selected from the group of UVA and UVB absorbing chemicals. The UVA and UVB absorbing chemicals are dissolved in an organic solvent and mixed to said optically clear ink to form a UVA and UVB blocking composition which is applied on top of the previously applied photochromic composition.

It will become clear through a detailed description of preferred embodiments that the present invention teaches a UVC or solar blind detector with the manipulation of photochromic chemicals and chemical wavelength-selective blocks. It will also become clear that the UVC or solar blind detector is calibrated to indicate the amount of UVC radiation the UVC sensor area is exposed to.

BRIEF DESCRIPTION OF THE DRAWINGS

The method for making and calibrating the solar blind detector is described in detail in the following embodiments with the accompanying drawings of which.

DESCRIPTION OF PREFERRED EMBODIMENTS

Figure 1:
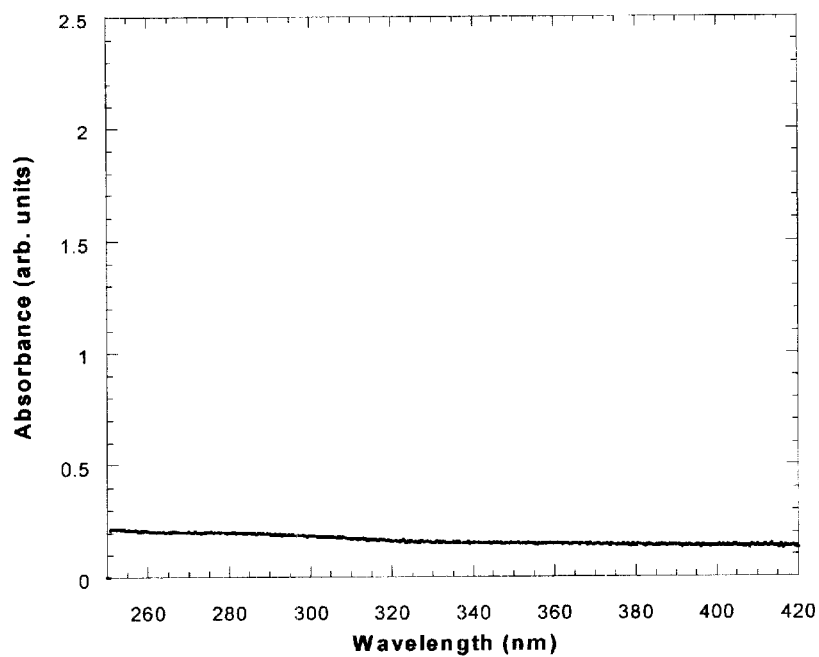
FIG. 1: Shows the ultraviolet absorption spectrum of the NAZDAR S2 optically clear vinyl ink base used as a matrix for the photochromic compound and UV blocking chemicals.

An aspect of the present invention is to provide a photochromic Solar Blind UV detector sensitive in the UVC wavelength region but not responsive to UVB and UVA wavelengths. This detector uses the phenomenon of color change from a clear state to a visible color when excited with UV radiation. The color change is easily detected by the naked eye, thus the present detection system does not necessitate any special visualization apparatus. It is based on the incorporation of photochromic molecules into optically clear polymer matrices.

The selection of a specific photochromic molecule depends on the application sought. In one embodiment of the present invention, a method for making a Solar Blind UVC detector is provided, the method include:

(1) Selecting a molecule that is preferably devoid of photochromic activity beyond 380 nm but sensitive in the UVC range [200 nm–280 nm].

(2) Selecting a host polymer matrix for this molecule that is transparent in the visible as well as in the UVC range. Indeed, since the ultimate objective is to create a UVC detector it is preferable that the host matrix be transparent in the UVC range. Throughout the course of my ultraviolet detection studies, a vinyl-acrylic base ink composition, which is transparent in the UVC region, in particular around 253.7 nm is discovered.

(3) Selecting a host polymer matrix preferably optically transparent in the visible spectrum to be able to see the color change of the photochromic molecules imbedded in the matrix.

A method known in the art (cf., U.S. Pat. Nos. 5,581,090 and 5,914,197) for creating a photochromic ultraviolet detector involves dissolving the photochromic in an organic solvent, preferably non-polar solvent, and mixing the obtained solution with an ink vehicle. The ink vehicle is playing the role of the polymer host matrix. Ultraviolet stabilizers and anti-oxidants are preferably added to the mixture to increase lifetime of the photochromic compounds. The obtained photochromic ink mixture is then applied as a thin layer on a white sheet of plastic, coated paper or any other suitable substrate material by known printing techniques such as screen printing. The layer is then allowed to totally dry by solvent evaporation before activating it with UV. The source for activating this layer can be any commercially available UV source. It may also be activated by sunlight. The intensity of color change is proportional to the concentration of the photochromic chemicals incorporated into the ink vehicle and also proportional to the amount of UV intensity. This thin layer applied on a white substrate material is referred to as the UV-sensing area. The selection of a white substrate material is motivated by the fact it is easier to distinguish any color change when the background is white.

The selection of an adequate host matrix and a photochromic chemical satisfying the conditions listed above do not suffice to create a Solar Blind detector or a UVC detector since the photochromic polymeric composition is to this point also sensitive to all components of UV radiation. Therefore, another step is added:

(4) Selection of UVA and UVB blocks that can shield the photochromic sensor area previously applied on a white substrate material from UVA and UVB radiation.

For that purpose, another layer or layers of optically clear ink containing the UVA and UVB blocks in precise proportions must be applied on top of the photochromic layer. In this way, the top layer would allow UVC photons to pass through but will block UVA and UVB photons from exciting the photochromic molecules. The UVA and UVB absorbing compounds may be for example, dissolved in the ink vehicle in the same manner outlined for the photochromic compounds and UV stabilizers.

After subsequent application of UVA and UVB blocking chemicals, the obtained sensing area is now only sensitive to UVC. Therefore, it is clear that the resulting sensor satisfies the "solar blind" qualities defined previously.

To be able to quantify the amount of UVC photons reaching the sensor area, it may be necessary to calibrate the detector in a manner as to indicate that the obtained color intensity is proportional to a corresponding amount of UVC photons being detected. In other words, the color response to a certain amount of UVC radiation needs to be defined by comparison with a chart of varying color intensities (gradient color scale). This chart of color intensity or color code is determined by selection of several different grades of color intensity corresponding to measured UVC radiation levels by a calibrated digital photometer. This step of correlating the gradient color scale with a set of numbers describing the amount of photons impinging the UVC sensor area is the calibration process.

A working model of the Solar Blind-UVC sensor is developed following the method described above. Each of the chemical ingredients involved in the creation of the sensor is selected according to their chemical and physical characteristics. The reactive chemicals that are capable of detecting UVC radiation consist of an ink base containing the photochromic chemical (e.g., spirooxazine) as well as any other additional chemicals necessary for blocking the other portions of the ultraviolet light (UVA and UVB). There are, however, several different combinations of chemicals that can produce these results, so in order to determine the appropriate combination, spectroscopic data of each chemical and each mixture thereof is acquired.

1. Selection of an Ink Carrier (Host Polymer Matrix)

In one embodiment, the ink base chosen is the NAZDAR S2 vinyl-acrylic base because it offers minimal absorption in the UV (FIG. 1). NAZDAR S2 ink, manufactured by Nazdar Corporation of Chicago, Ill., has the following constituents: cyclohexanone, 2-butoxyethanol acetate, diethylene glycol ethyl ether acetate, aliphatic dibasic acid esters (0–20%), acrylic resin, vinyl resin (20–35%), epoxy resin and, plasticizer.

Figure 2:
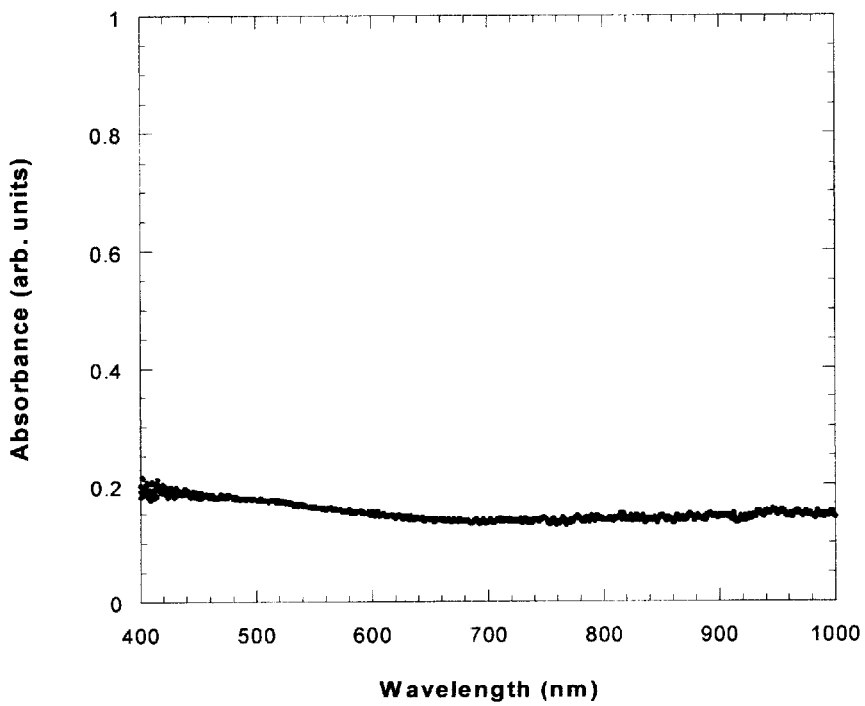
FIG. 2: Shows the visible absorption spectrum of the NAZDAR S2 clear vinyl ink base used as a matrix for the photochromic compound and UV blocking chemicals.

The S2 base is also optically clear (FIG. 2) and appears transparent when it is applied to a substrate. Indeed, if the ink base has the slightest tint of another color, the color change induced will be biased and the actual amount of radiation exposure will be difficult to compare with the color code.

2. Selection of the Photochromic Molecule

In one embodiment, the photochromic molecule selected is P380-Y having the following chemical formula:

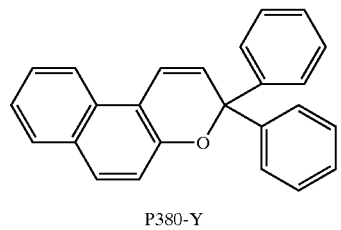

P380-Y

Figure 3:
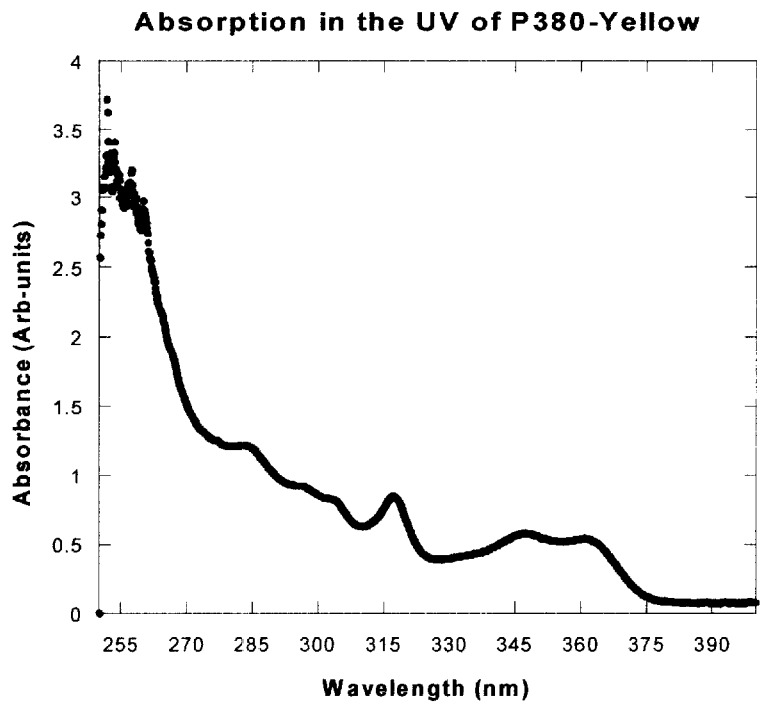
FIG. 3: Shows the ultraviolet-range absorption of the P380-Y photochromic chemical. Note that it does not absorb wavelengths longer than about 380 nm.

P380-Y is dissolved and added to the S2 base to produce an optically clear ink that can be applied in a thin layer (for example, at a thickness of 20 to 30 micrometers) to a plastic card substrate or a similar medium such as, but not limited to, a coated white paper. The obtained photochromic-ink layer exhibits a color change from clear to a bright yellow color when it is exposed to radiation of wavelengths between approximately 200 nm and 380 nm. As seen in FIG. 3, the photochromic molecule absorbs light with wavelengths from 200 to 380 nm.

As it has been pointed out in my previous inventions, the photochromic substance has a limited lifetime due to oxidation processes. Therefore, the adjunction of Uv stabilizers is recommended. After performing tests on different stabilizers available in the market, TINUVIN 765 and TINUVIN 144 Hindered Amine Light Stabilizers (HALS), supplied by Ciba, Additive Division, have been selected for their performance under sunlight. The stabilizers may be added for example in a proportion of 1% to 5% of the base by weight. TINUVIN 765 product has the following chemical formula: bis(1,2,2,6,6-Pentamethyl-4-piperidinyl) sebacate in (75–85% by weight) and Methyl(1,2,2,6,6-pentamethyl-4-piperidinyl) sebacate in (15–25% by weight). The chemical formula for TINUVIN 144 is: bis(1,2,2,6,6-Pentamethyl-4-piperidynyl) (3,5-di-tert-butyl-4-hydroxybenzyl) butylpropanedioate. The Hindered Amine Light Stabilizers may be incorporated in the photochromic composition so as to be in close physical proximity to the organic photochromic compounds imbedded in organic matrices (clear polymers/ink base). For increased stability, anti-oxidants may be added to the polymeric matrix. For example, IRGANOX chemicals supplied by Ciba are chosen for their ability to effectively inhibit oxidation and thermal degradation of many organic and polymeric materials. IRGANOX 1076 with the chemical name Octadecyl 3,5-di-tert-butyl-4-hydroxyhydrocinnamate, and IRGANOX 259 with the chemical name Hexamethylene bis(3,5-di-tert-butyl-4-hydroxyhydrocinnamate) supplied by Ciba Additive division have been tested. Anti-oxidant chemicals are added, for example, in a proportion of 1% to 5% by weight to the polymeric matrix (ink vehicle).

3. Selection of UVA and UVB Absorbers or Blocks

Research was conducted to find candidates for blocking the UVA [320–400 nm] and UVB [280–320 nm] radiation. Possible chemicals for blocking UVA radiation include, but are not limited to, PARSOL 1789 [1-(4-methoxyphenyl)-3-((1,1-Dimethylethyl) Phenyl)-3-Hydroxy-2-Propen-1-One], by Roche corporation, and NEO HELIOPAN MA [Methyl Anthranilate], by Haarmann & Reimer Florasynth, Inc. Possible blocks for the UVB radiation include, but are not limited to, NEO HELIOPAN AV [p-Methoxycinnamic acid-2-ethylhexylester] and NEO HELIOPAN OS [2-Ethylhexyl salicylate], both from Haarmann & Reimer Florasynth, Inc. The absorption spectra of these chemicals are shown respectively on FIGS. 4, 5, 6, and 7.

Figure 7:
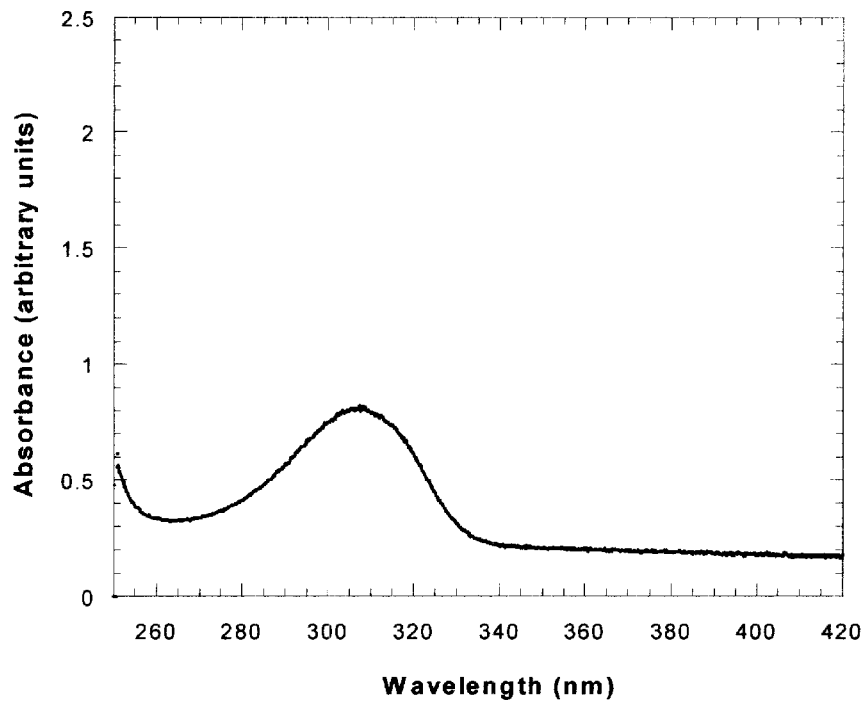
FIG. 7: Shows the ultraviolet absorption region of NEO HELIOPAN OS blocking compound imbedded in S2 NAZDAR matrix.
Figure 8:
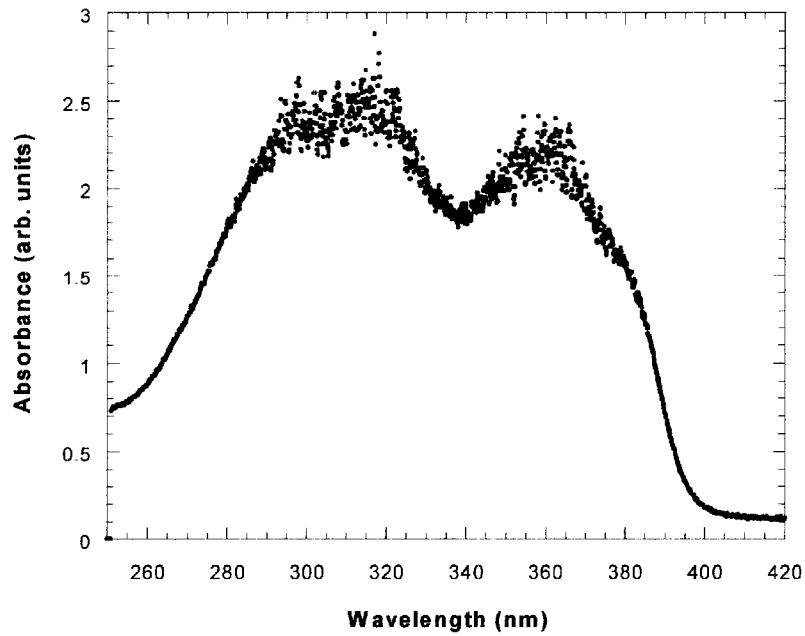
FIG. 8: Shows the ultraviolet region absorption of the final blocking compound used for the UVC detector, consisting of the NEO HELIOPAN AV, and the PARSOL 1789 imbedded in the S2 NAZDAR matrix.

The desired response of the chemical composition used to measure UVC is attained by finding the right mixture of ink base and blocking additives that absorb light from about 280 nm to 400 nm in wavelength. In one embodiment, the UVA and UVB chemical blocks are mixed into a different aliquot of the same S2 matrix, and screen-printed onto a quartz slide, in a thin layer of approximately 25 to 30 microns, to be tested with a spectrometer in the UV Band. As seen in FIG. 5, NEO HELIOPAN MA absorbs a decent part of the UVB and UVA, but it has a large absorption peak in the UVC portion as well, starting at about 265 nm, going to shorter wavelengths. The NEO HELIOPAN OS also absorbs in the UVB region, but there is again some absorption in the UVC, for wavelengths under 255 nm (FIG. 7). These two chemical absorbers are, therefore, discarded because they do not satisfy the requirements for not absorbing in the UVC region of the spectrum. In one embodiment, the best combination of blocking additives is found to be the PARSOL 1789 (FIG. 4) and the NEO HELIOPAN AV (FIG. 6), which together, absorb a minimal amount of the UVC portion while absorbing the UVA and UVB portions of the light (FIG. 8). These two chemicals having the following chemical formulas:

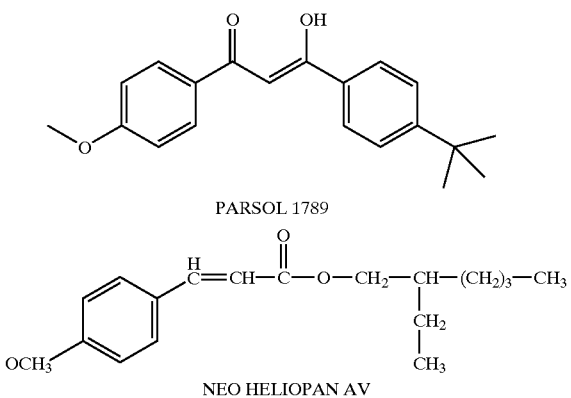

Figure 4:
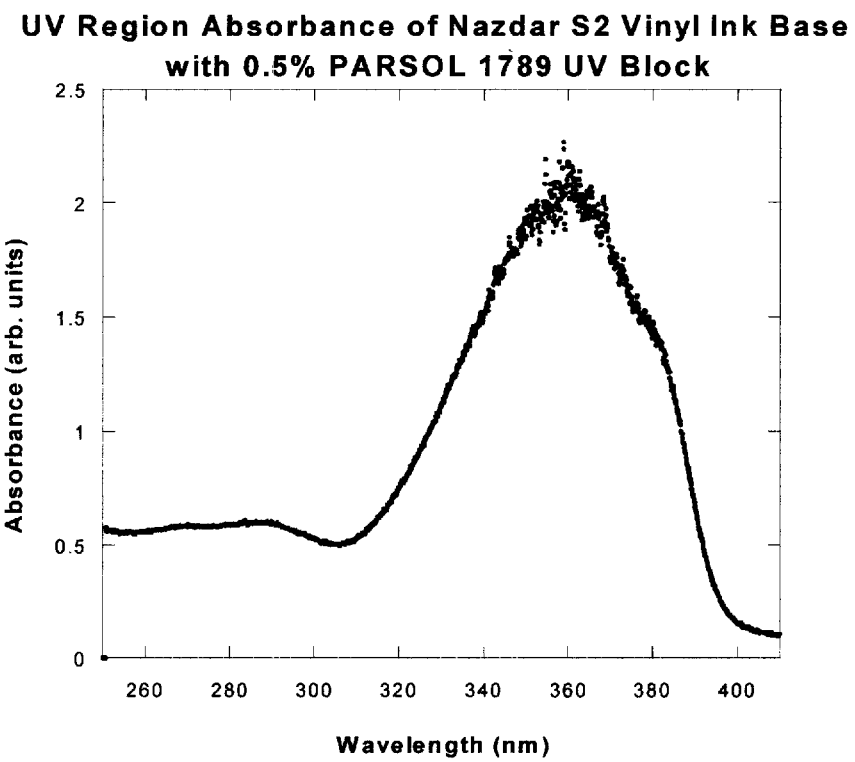
FIG. 4: Shows the ultraviolet absorption region of PARSOL 1789 UVA-blocking compound imbedded in S2 NAZDAR optically clear matrix.
Figure 5:
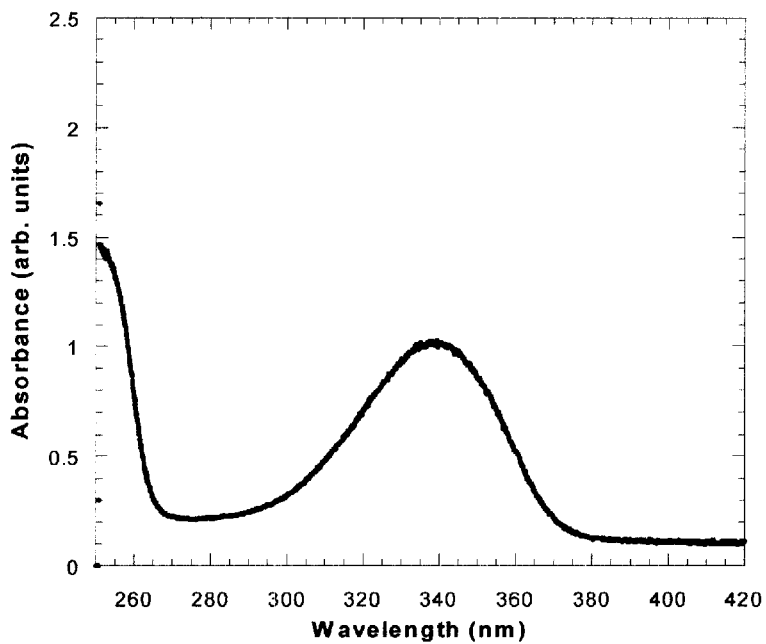
FIG. 5: Shows the ultraviolet absorption region of NEO HELIOPAN MA blocking compound imbedded in S2 NAZDAR optically clear matrix.
Figure 6:
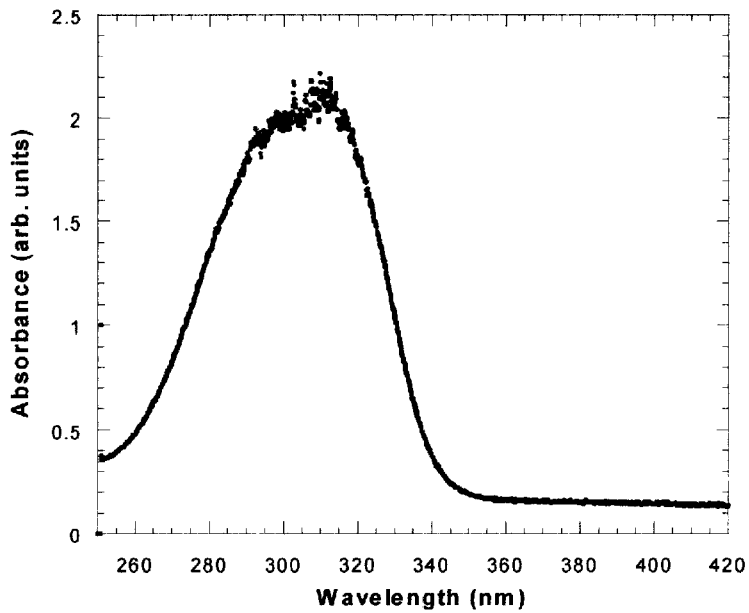
FIG. 6: Shows the ultraviolet absorption of NEO HELIOPAN AV UVB-blocking compound imbedded in S2 NAZDAR clear matrix.

Indeed, as seen from FIG. 4, PARSOL 1789 absorbs from about 310 to 400 nm, and from FIG. 6, HELIOPAN AV absorbs from about 260 to 340 nm. Therefore, a mixture of the two chemicals generates a UVA-UVB block that is used to filter out the undesired ultraviolet sunlight (FIG. 8).

Testing the Working Model

Figure 9:
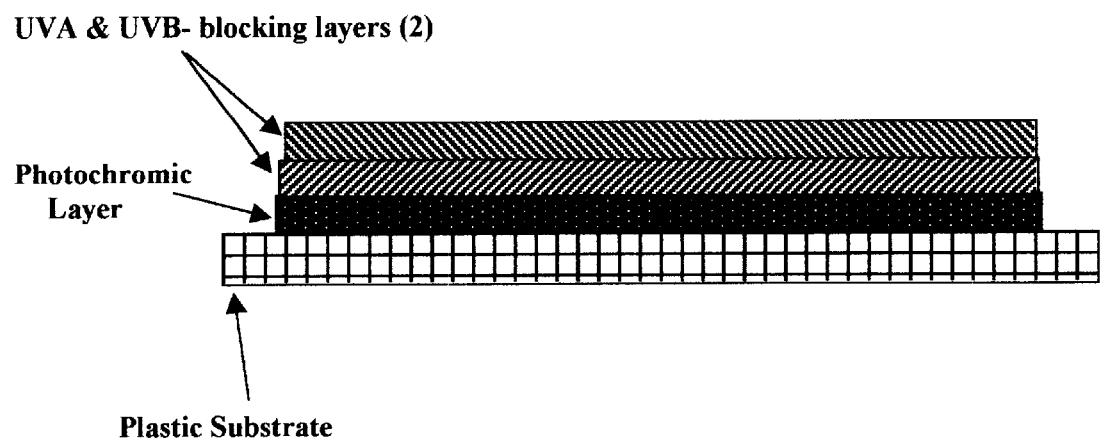
FIG. 9: Shows an expanded cross-section view of the UVC detecting card—a white plastic substrate coated with one layer of the active photochromic ink and layer(s) of the UVA and UVB blocking mixtures.

Following this spectroscopy study, a prototype is fabricated. In one embodiment, one layer, of S2 containing the photochromic compound, and optionally stabilizers is applied onto a plastic card for example, and then dried with hot air. The blocking compounds are then added to another S2 base aliquot and applied on top of the previously dried photochromic layer. In another embodiment, this application of the blocks is repeated twice to achieve substantially total blocking of the UVA and UVB bands (FIG. 9). In one embodiment, the best concentration of the photochromic molecule, in this case for example P380-Y, is determined experimentally through testing to be 4%, by weight, of the ink base and, each of the two blocking compounds are mixed at 3%, by weight, of the S2 base. However, one skilled in the art would appreciate that these concentrations may be adjusted depending on the application sought. When exposed to direct sunlight, the sample substrate with one layer of the photochromic ink covered with two layers (one to a plurality of layers is also within the scope of the present invention) of blocking compound did not experience any change in color, as expected. This proved that the chemical composition sufficiently shields the bottom layer containing P380-Y from the UVA and UVB light. However, when exposed to light that is strictly UVC, such as a mercury lamp, a color change occurs. Experimental trials applying the ink showed for example that two layers of the blocking composition at the above mentioned concentration, rather than one, are preferable in this instance to block the portions of light as desired. In one embodiment, the concentration of the photochromic chemical P380-Y is for example selected to be 4% of the weight of the S2 base to allow for an intense color change under UVC light. One skilled in the art would appreciate that varying the concentration is also within the scope of the present invention. The goal being to facilitate the viewing of the color change, under normal conditions, by the naked eye.

The production of a fully operational prototype that can measure the intensity of its exposure to UV radiation involves a calibration procedure. The color response to a certain amount of radiation may be defined by the selection of several different grades of color intensity (color gradient scale) that correspond to several levels of UVC radiation.

5. UVC Sensor Calibration Procedure

Figure 10:
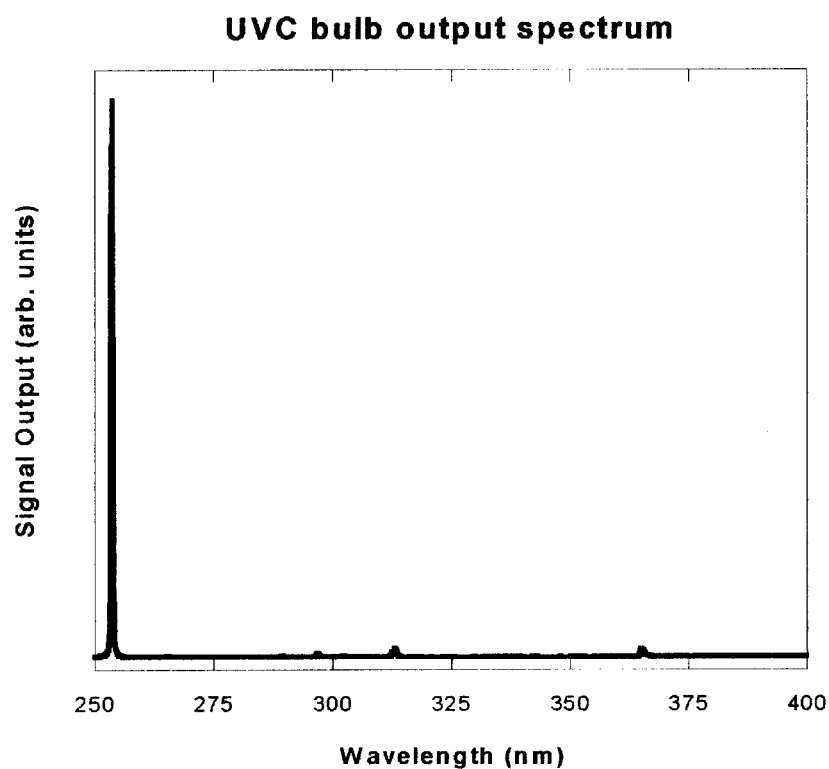
FIG. 10: Shows the output signal of the UVC bulb used in calibrating the UVC Solar Blind detector. Note the characteristic peak at about 254 nm.

Selecting the appropriate colors (color gradient scale) or color code to be printed on the UVC-sensing cards is one part of building the UVC photochromic detector since the color code acts as a reference by which the active layer change in color can be compared to. Users of UVC sources such as mercury lamps can, therefore, determine whether their UVC lamps are performing with the desired integrity. As mentioned previously, the solar blind-UVC photochromic sensor can be created by screen-printing a white substrate (e.g., plastic card) with one layer of the active ink (with the photochromic chemical) and for example two layers of the blocking ink compound (containing PARSOL 1789 and Heliopan AV). Each layer of deposited ink is dried with hot air before applying the next layer. The UVC source used in the experimentation is a mercury vapor lamp provided by EBW Electronics of Holland, Michigan. FIG. 10 shows the output signal of the UVC bulb used in calibrating the UVC Solar Blind detector.

5.1. Energy Measurements

Figure 11:
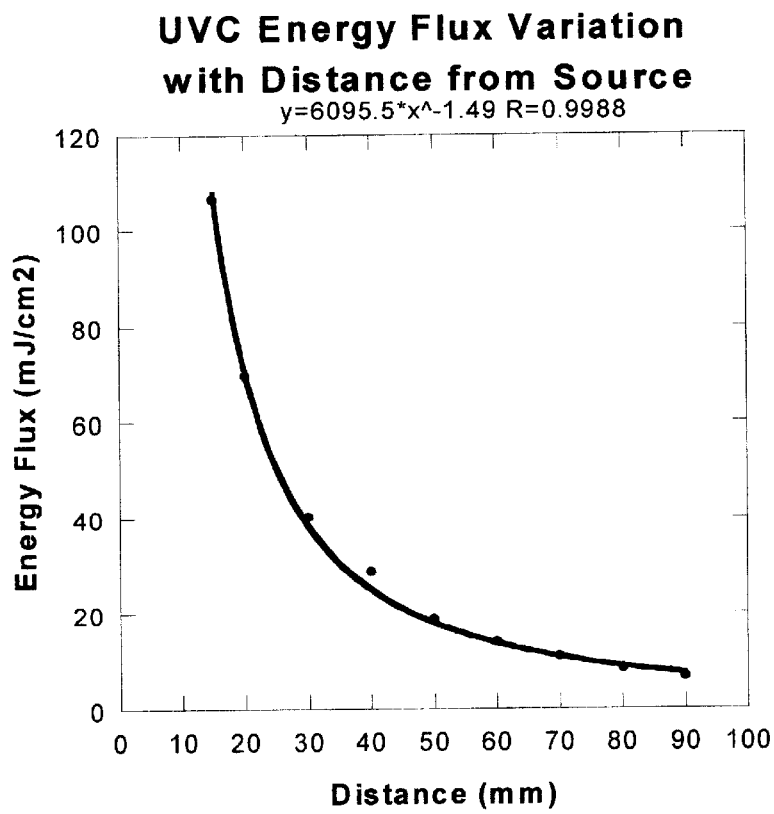
FIG. 11: Shows the energy flux at each distance from the UVC bulb, as measured by the UVC probe and photometer.

In one embodiment, the amount of radiation, the card comprising the UV sensor is exposed to, is measured by means of an Oriel photometer with a UVC probe that gives a digital read out of the energy flux output. The Oriel Instrument, manufactured by Oriel Corporation, is calibrated to CIE specifications at 254 nm with CSIR traceable standards of calibration. All measurements are taken at distances of 15, 20, 30, 40, 50, 60, 70, 80, and 90 millimeters from the center of the UVC lamp and summarized in FIG. 11.

5.2. Absorption Measurements

The next step accomplished in the calibration procedure is quantifying the color response that results from a 45 seconds, for example, exposure time to the UVC radiation a t each of the energy levels measured by the ORIEL Instrument. This is accomplished using reflective spectroscopy to acquire absorption curves of the UVC sensor area after excitation by the lamp at each of the nine distances. In one embodiment, the UVC detection card is held perpendicular to the ground with a clamping device and its distance from the center of the bulb is carefully measured. The reference signal for the spectroscopy is taken by shining the light onto a white part of the same plastic card used in the calibration. The card is set up at each of the nine distances and after 45 seconds (this time can be selected depending on the calibration and energy measurements), it is, preferably, immediately placed in liquid nitrogen to hold the color that it exhibited at that level of light intensity (without cooling with liquid nitrogen, the color relaxes back to clear quickly). The water condensation that is accumulated on the card due to the nitrogen cooling is wiped off and the visible absorption spectrum is immediately taken with the spectrometer.

Figure 12:
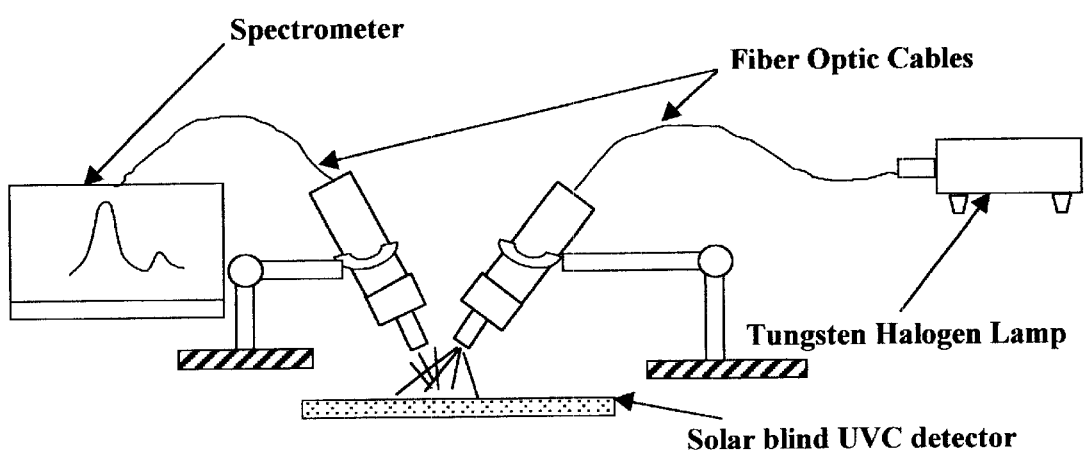
FIG. 12: Shows the experimental apparatus used during the calibration phase of the detection card. Reflective spectroscopy technique is used in the study. The spectral data is acquired with a fiber optics spectrometer driven by a computer.
Figure 13:
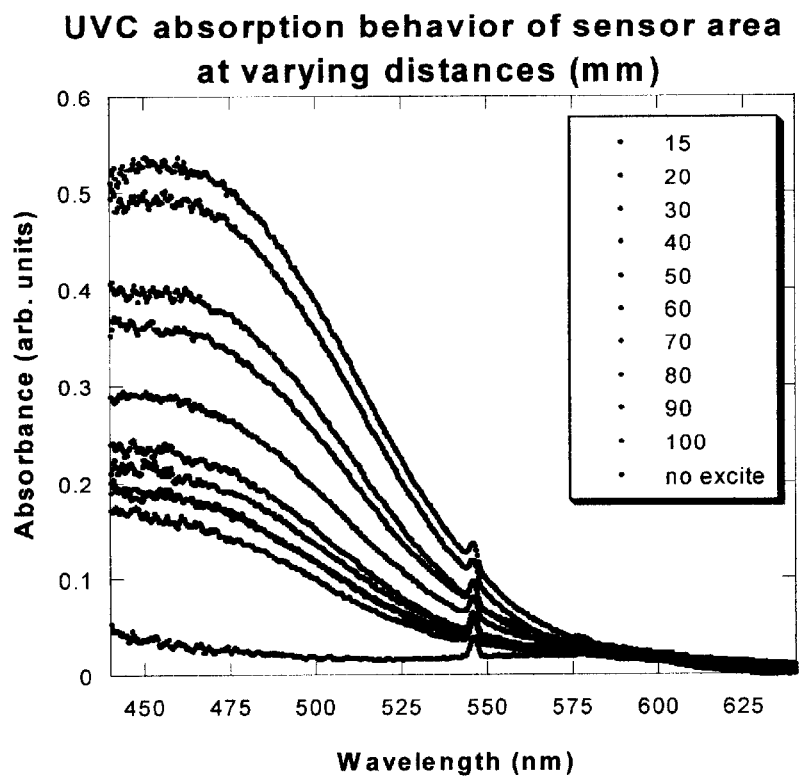
FIG. 13: Shows the visible absorption spectra of the UVC solar blind sensor area at each distance from the bulb, as listed in the figure in millimeters. The largest curve corresponds to the highest level of exposure, at 15 mm.
Figure 14:
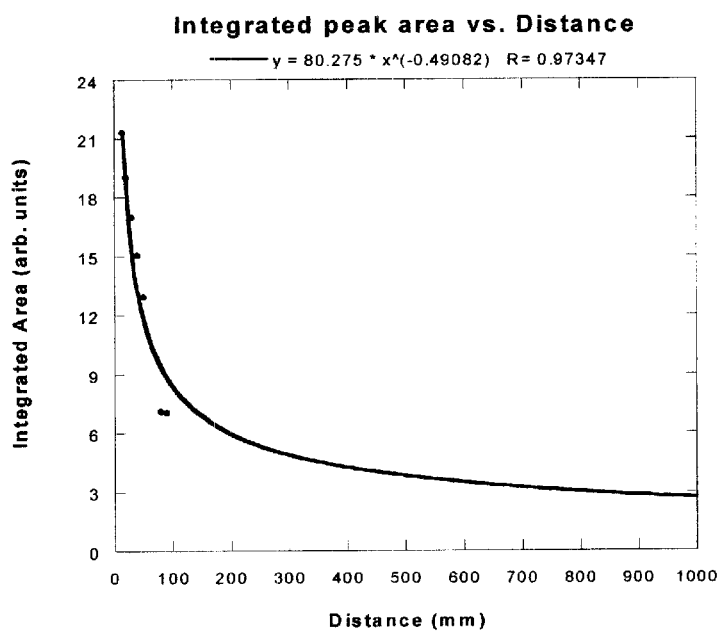
FIG. 14: Shows the integrated area calculation for each of the peaks at each of the respective distances from the UVC bulb, as seen on FIG. 13.

The absorption spectra are all taken for the respective exposure distances using reflective spectroscopy as shown in FIG. 12. In addition, the absorption spectrum of the non-excited layer is also taken (FIG. 13). The experiment is repeated for three different UVC sensor cards to verify the reproducibility of the spectroscopic results. The obtained color (yellow) absorption spectra are all integrated around the peak of interest 455 nm that is from 450 nm to 570 nm (FIG. 13) to extract numbers corresponding to the areas under the peak of interest. These areas are directly related to the color intensity, with a larger area corresponding to a more intense color. Following this calculation, the area for each of the distances is plotted and a curve is fit to the data points (FIG. 14).

Color-Area Correlation with the Energy Output of Mercury Lamp

Figure 15:
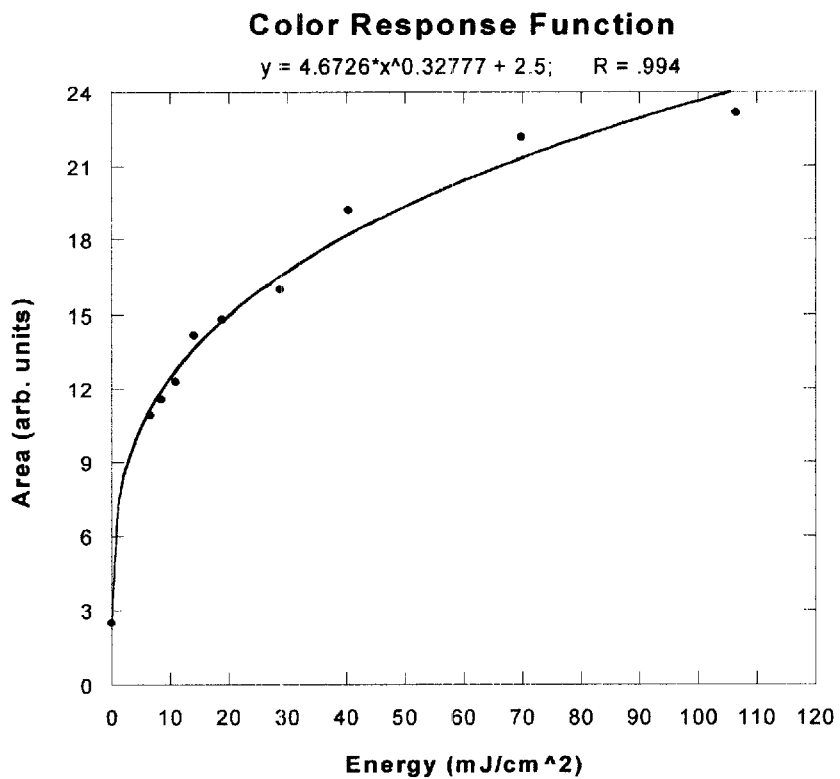
FIG. 15: Shows the integrated area for each absorption peak plotted against the corresponding energy level measured at the corresponding distance as shown in FIG. 11.
Figure 16:
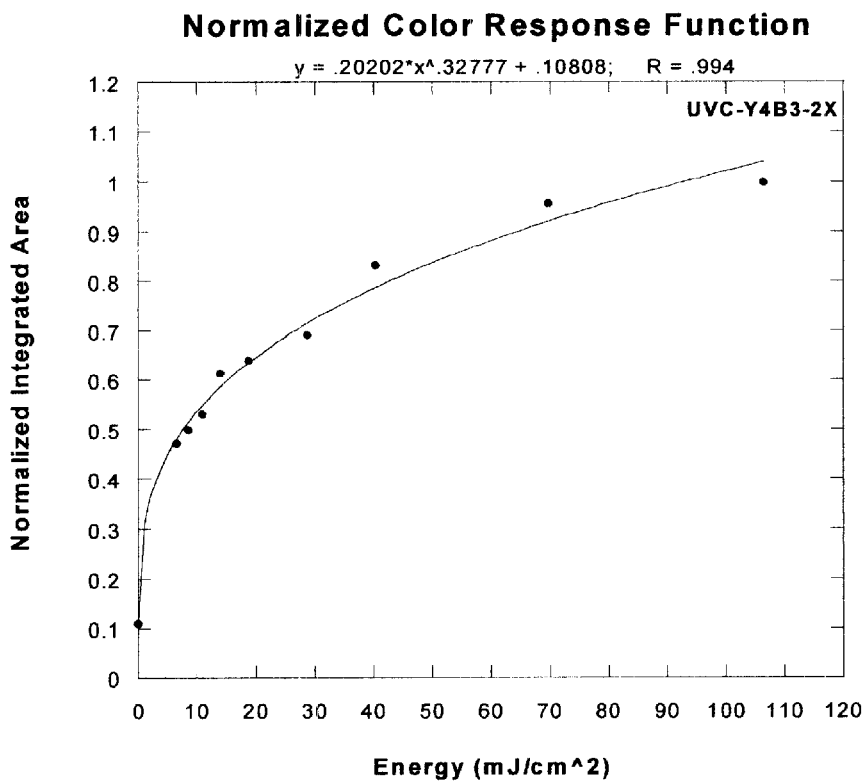
FIG. 16: Shows the same area and energy measurements of FIG. 15, but normalized such that the most intense level of exposure (at 15 mm) corresponds to an integrated area equal to 1.

These area points representing the color intensity are then plotted against the energy for all of the distances and the points fitted to a polynomial curve having the following equation:

$$Y = 4.673 x^{0.3278} + 2.65$$

Where y represents the area and x represents the energy flux (FIG. 15). After normalizing the areas so that one corresponding to the most intense exposure is equal to one, the equation of the power curve becomes (FIG. 16):

$$Y = 0.202 x^{0.3278} + 0.108$$

The color of the most intense UVC exposure is also frozen with nitrogen several times and scanned with the COLORTRON II calorimeter manufactured by Light Source, Inc of Larkspur, Calif., to give the closest PANTONE color match. The color chosen to be printed on the UVC detection plastic-card as the comparison color code is PANTONE coated 141 CVC (FIG. 17) in this instance. The CMYK (Cyan, Magenta, Yellow, and Black) values that make up this color are noted and the necessary CMYK values of each of the other energy levels are calculated by mathematical regression, based on their percentage of the largest integrated area value using the equation determined previously. The CMYK values for every 10%, for example, of the maximum energy output (about 106 mJ/cm$^2$) are plugged into a color software in order to visually compare the variation among the color blocks (to determine if adjacent color blocks can be distinguished by the naked eye).

Figure 17:
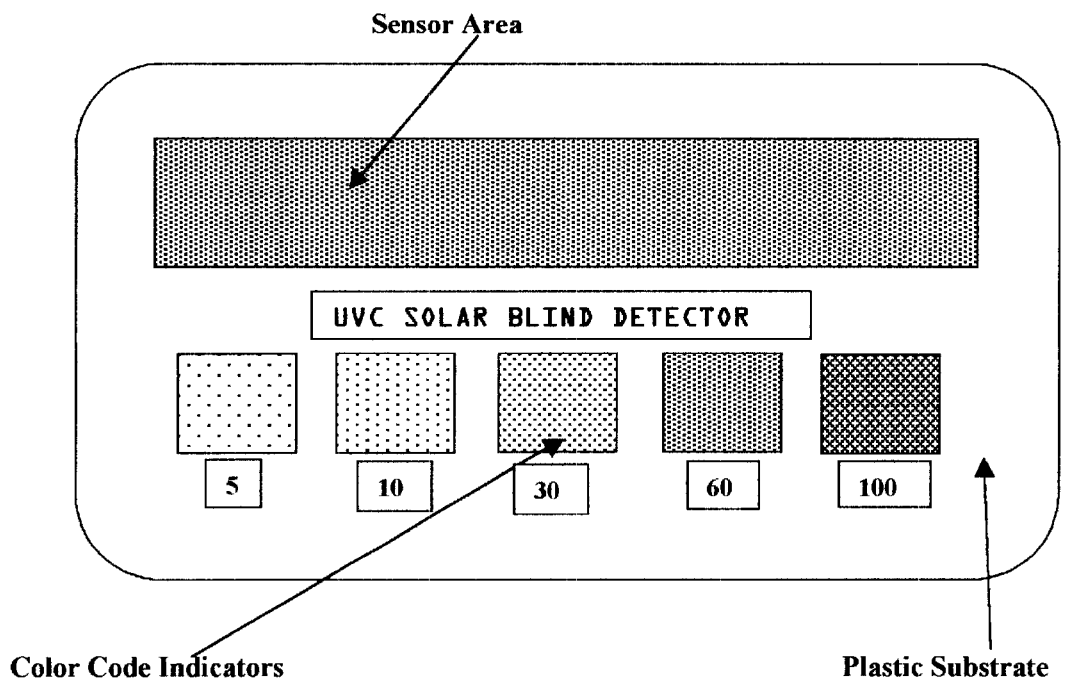
FIG. 17: Shows a possible representation of a UVC solar blind detection system, with a sensing region (at the top) and a reference color code with five grades of increasing color intensity from left to right. The number below each indicating box represents the energy flux (in $mJ/cm^2$) corresponding to each level of color response.

The color code, with the corresponding energy numbers, is then printed on a plastic substrate, for example, next to the UVC sensor area to allow the user to compare the activated color with the colored blocks (color code) as shown on FIG. 17. The number of colored blocks in the color code, is selected to allow the user to distinguish easily between two adjacent colored blocks. The solar blind active sensor area printed on a plastic substrate with its calibrated color code and the corresponding energy numbers can then be exposed to any UVC source in presence of sunlight without being perturbed by the sunlight. The user can, therefore, compare the color change of the UVC sensor area with the closest matching colored block printed adjacent the UVC sensor area. Finding the closest matching color allows the user to read the energy number printed under the corresponding colored block, thus allowing the user to quantify the amount of UVC intensity detected.

Figure 18:
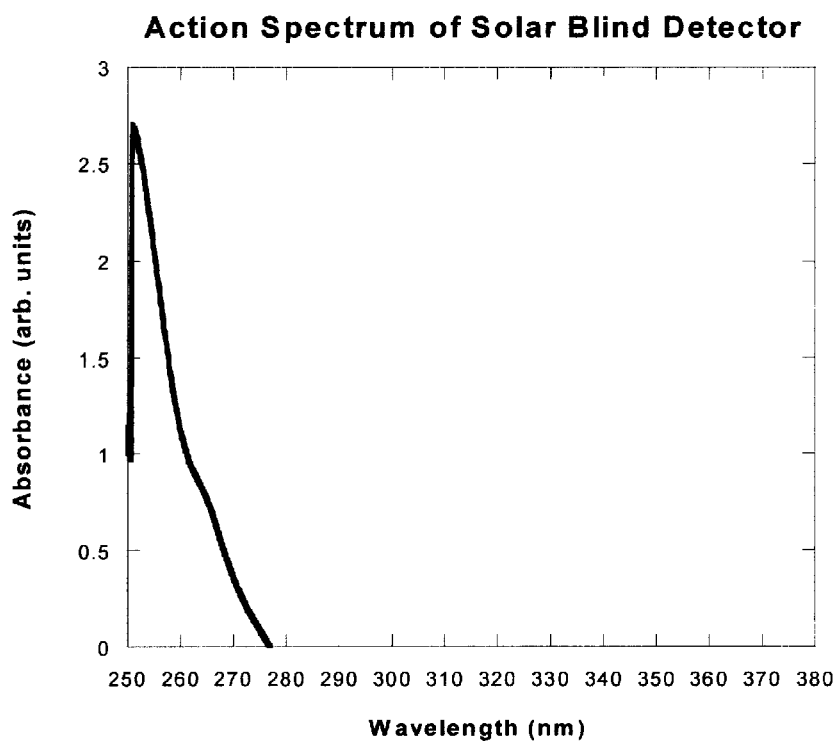
FIG. 18: Shows the action spectrum of the solar blind detector. With the use of UVA and UVB blocks the wavelength cut off is less than 280 nm.

The solar blind detector allows measuring the UVC intensity without being perturbed by the presence of sunlight (i.e, Visible, UVA and UVB light) as shown on the action spectrum (FIG. 18). In addition, by using a plastic substrate, for example, the solar blind detector can be immersed in water without altering its characteristics. Moreover, the chemicals applied on the plastic do not leach into any aqueous medium thus allowing its use in aqueous or aquatic environment. In addition, tests have shown that the solar blind UVC detector of the present invention does not contaminate the medium being exposed to UVC. One example of application for this solar blind detector is monitoring the UVC intensity emitted by a mercury lamp at 253.7 nm used in decontamination of water or air.

While the invention has been particularly shown and described with reference to preferred embodiments, it will be understood by those skilled in the art that various changes in form or in detail may be made therein without departing from the spirit and scope of the invention. For instance, this calibration procedure can be done with any type of UVC source and a solar blind detector can be developed to fit a particular application. For example, if the UVC source is more or less intense, parameters such as concentration of the active photochromic chemical or the UVA and UVB absorbers can be manipulated and adjusted to achieve the desired results. Moreover, thickness of the layers deposited on the plastic or paper substrate can be increased or decreased. In addition, the shape of the solar blind sensor is not limited to a plastic card but it may be adapted to fit various forms depending on the application sought (such as applied on glass, metal, paper etc . . . ). Another aspect of this invention is the ability to calibrate any photochromic ultraviolet sensor using the method of calibration described in this invention. The calibration of the UV sensor allows the user to quantify the amount of ultraviolet radiation being detected.

What is claimed is:

1. A method for making a Solar Blind UVC detector comprising:
   providing a photochromic compound including at least one of a spiroxazine and a spiropyran molecule and a chromene derivative;
   providing an optically clear ink matrix selected for its property of minimal absorption in the UVC region;
   mixing said photochromic compound with said optically clear ink matrix to produce a photochromic ink composition;
   applying said photochromic ink composition in a form of a photochromic layer on a substrate material;

drying said photochromic layer;

selecting UVA and UVB absorbing chemicals;

mixing said UVA and UVB absorbing chemicals with said optically clear ink matrix to create a UVA and UVB blocking composition;

applying said UVA and UVB blocking composition in a form of a UVA and UVB blocking layer on top of the photochromic layer; and drying said UVA and UVB blocking layer to form a solar blind UVC detector wherein only UVC is detected.

2. The method as set forth in claim 1, wherein said mixing said photochromic compound with said optically clear ink matrix comprises dissolving said photochromic compound into an organic solvent to obtain a photochromic solution and mixing the solution with said optically clear ink matrix.

3. The method as set forth in claim 2, wherein said mixing said photochromic compound with said optically clear ink matrix further comprises adding an ultraviolet light stabilizer and an anti-oxidant to said optically clear ink matrix.

4. The method as set forth in claim 2, wherein said photochromic compound is used in a concentration between 0.1% to 10% percent by weight of said optically clear ink matrix.

5. The method as set forth in claim 3, wherein said ultraviolet light stabilizer includes a hindered amine light stabilizer.

6. The method as set forth in claim 5, wherein said hindered amine light stabilizer is used in a concentration between 1 to 5 percent by weight of said optically clear ink matrix.

7. The method as set forth in claim 3, wherein said anti-oxidant includes a hindered phenolic anti-oxidant.

8. The method as set forth in claim 7, wherein said hindered phenolic anti-oxidant is used in a concentration between 1 to 5 percent by weight of said optically clear ink matrix.

9. The method as set forth in claim 1, wherein said applying said photochromic ink composition in a form of a photochromic layer comprises applying the photochromic ink composition in a form of a photochromic layer on a substrate material selected from the group consisting of plastic, paper, metal, and glass.

10. The method as set forth in claim 1, wherein said selecting UVA and UVB absorbing chemicals comprises selecting UVA and UVB absorbing chemicals that minimally absorb in the UVC region of the spectrum.

11. The method as set forth in claim 1, wherein said mixing said UVA and UVB absorbing chemicals with said optically clear ink matrix comprises dissolving said UVA and UVB absorbing chemicals in an organic solvent to obtain a solution and mixing the solution with the optically clear ink matrix to obtain the UVA and UVB blocking composition.

12. The method as set forth in claim 11, wherein said UVA and UVB absorbing chemicals are used in a concentration between 0.1% to 20% percent by weight of said optically clear ink matrix.

13. The method as set forth in claim 1, wherein the solar blind UVC detector is calibrated to a known detector using a calibration method.

14. The method as set forth in claim 13, wherein said calibration method comprises:

exposing the solar blind UVC detector to a known UVC radiation source;

measuring a color change of said solar blind UVC detector by reflective spectroscopy to obtain a color change spectroscopy data;

correlating the color change spectroscopy data with a color code consisting of printed colored blocks, wherein a color hue of each colored block is correlated to an amount of UVC photons striking the solar blind UVC detector.

15. The method as set forth in claim 14, wherein said exposing the solar blind UVC detector to a known UVC radiation source is carried out at different distances for an exposure time and, said exposure time is the same for all distances.

16. The method as set forth in claim 15, wherein said measuring the color change is performed at each distance using reflective spectroscopy.

17. The method as set forth in claim 14, wherein said correlating the color change spectroscopy data to the color code is performed using mathematical formulas.

18. A solar blind UVC detector comprising:

a photochromic chemical selected from the group consisting of spiropyrans, spirooxazines and chromene derivatives;

an organic solvent;

an optically clear ink selected from the group comprising inks having the property of minimally absorbing in the UVC region of the spectrum;

a UVA absorbing chemical;

a UVB absorbing chemical; and a substrate;

wherein said photochromic chemical is dissolved in said organic solvent to obtain a photochromic solution which is mixed with a first aliquot of said optically clear ink to form a photochromic composition which is applied in a form of a photochromic layer on said substrate, and said UVA absorbing chemical and said UVB absorbing chemical are mixed to a second aliquot of said optically clear ink to form a UVA and UVB blocking composition which is applied on top of said photochromic layer.

19. The solar blind UVC detector of claim 18 further comprising:

an ultraviolet stabilizer selected from the group consisting of hindered amine light stabilizers, and an anti-oxidant selected from the group consisting of hindered phenolic anti-oxidants, wherein said ultraviolet stabilizer and said anti-oxidant are added to said photochromic composition.

* * * * *